US012675598B2

(12) United States Patent
Arora et al.

(10) Patent No.: US 12,675,598 B2
(45) Date of Patent: Jul. 7, 2026

(54) PRIVACY-PRESERVING IDENTITY DATA EXCHANGE

(71) Applicant: Visa International Service Association, San Francisco, CA (US)

(72) Inventors: Sunpreet Singh Arora, San Francisco, CA (US); Saikrishna Badrinarayanan, San Francisco, CA (US); Srinivasan Raghuraman, San Francisco, CA (US); Kim Wagner, San Francisco, CA (US); Gaven James Watson, San Francisco, CA (US); David Henstock, San Francisco, CA (US); Jason Lightman, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 329 days.

(21) Appl. No.: 18/245,147

(22) PCT Filed: Sep. 28, 2021

(86) PCT No.: PCT/US2021/052380
§ 371 (c)(1),
(2) Date: Mar. 13, 2023

(87) PCT Pub. No.: WO2022/086680
PCT Pub. Date: Apr. 28, 2022

(65) Prior Publication Data
US 2024/0020410 A1 Jan. 18, 2024

Related U.S. Application Data

(60) Provisional application No. 63/109,566, filed on Nov. 4, 2020, provisional application No. 63/104,723, filed on Oct. 23, 2020.

(51) Int. Cl.
*G06F 21/62* (2013.01)
*H04L 9/08* (2006.01)

(52) U.S. Cl.
CPC ........ *G06F 21/6245* (2013.01); *H04L 9/0825* (2013.01)

(58) Field of Classification Search
CPC . G06F 21/6245; G06F 21/602; H04L 9/0825; H04L 9/0894; H04L 9/14; H04L 2209/56; H04L 2209/76
See application file for complete search history.

(56) References Cited

U.S. PATENT DOCUMENTS 5,664,017 A * 9/1997 Gressel ................. H04L 9/0833
380/30
2016/0371684 A1* 12/2016 Abbott ................ H04L 63/0421
(Continued)

FOREIGN PATENT DOCUMENTS

CN 104038341 A 9/2014
CN 104735070 A 6/2015
(Continued)

OTHER PUBLICATIONS

PCT/US2021/052380 , "International Search Report and the Written Opinion", Jan. 7, 2022, 11 pages.
(Continued)

*Primary Examiner* — Azizul Choudhury
(74) *Attorney, Agent, or Firm* — Kilpatrick Townsend & Stockton LLP

(57) ABSTRACT
A method is disclosed. The method comprises receiving, by a digital identity computer, a request for personal data associated with a user. The digital identity computer may retrieve encrypted personal data, wherein the personal data is encrypted with a public key associated with the user. The digital identity computer may encrypt the encrypted per-
(Continued)

sonal data with a first public key associated with a relying party or derivative thereof to form subsequently encrypted personal data. The method may then proceed to transmit the subsequently encrypted personal data or derivative thereof to a relying party computer, or a user device. If the user device receives the subsequently encrypted personal data, the user device may thereafter transmit the subsequently encrypted personal data or derivative thereof to the relying party computer. Then, the relying party computer obtains the personal data from the subsequently encrypted personal data or derivative thereof.

19 Claims, 11 Drawing Sheets

(56) References Cited

U.S. PATENT DOCUMENTS

| | | | |
|---|---|---|---|
| 2017/0237717 A1 | 8/2017 | Starosielsky et al. | |
| 2018/0137549 A1* | 5/2018 | Vadura | G06Q 30/0609 |
| 2019/0097812 A1 | 3/2019 | Toth | |
| 2019/0363883 A1 | 11/2019 | Rao et al. | |
| 2020/0162240 A1 | 5/2020 | Suzuki | |
| 2022/0147650 A1* | 5/2022 | Seth | H04L 9/14 |

FOREIGN PATENT DOCUMENTS

| | | |
|---|---|---|
| CN | 111034120 A | 4/2020 |
| CN | 111506907 A | 8/2020 |
| CN | 112861157 A | 5/2021 |

OTHER PUBLICATIONS

Zhang et al., "Consent-Based Access Control for Secure and Privacy-Preserving Health Information Exchange", Security and Communication Networks, vol. 9, Issue 16, 2016, pp. 3496-3508.

R. Petrlic, "Proxy Re-Encryption in a Privacy-Preserving Cloud Computing DRM Scheme", Research Gate, Conference Paper, Jan. 2012, Conference: The 4th International Symposium on Cyberspace Safety and Security (CSS 2012), 19 pages.

Lan et al., "A New Security Cloud Storage Data Encryption Scheme Based on Identity Proxy Re-encryption", International Journal of Network Security, vol. 19, No. 5, pp. 804-810, Sep. 2017 (DOI: 10.6633/IJNS.201709.19(5).18), pp. 804-810.

"Information Card", Available online at: https://en.wikipedia.org/w/index.phptitle=Information_Card&oldid=265064798, Jan. 19, 2009, 5 pages.

EP21883516.3 , "Extended European Search Report", Mar. 15, 2024, 8 pages.

Horandner et al., "Credential: A Framework for Privacy-Preserving Cloud-Based Data Sharing", 11th International Conference on Availability, Reliability and Security, Aug. 31, 2016, pp. 742-749.

Wang et al., "Privacy Preserving Computations Over Healthcare Data", International Conference on Internet of Things (iThings) and IEEE Green Computing and Communications (GreenCom) and IEEE Cyber, Physical and Social Computing (CPSCom) and IEEE Smart Data (SmartData), Jul. 14, 2019, pp. 635-640.

Wang et al., "Secure-Aware and Privacy-Preserving Electronic Health Record Searching in Cloud Environment", International Journal of Communication Systems, vol. 32, No. 8, Mar. 13, 2019, 11 pages.

CN202180065635.8, "Office Action", Jul. 3, 2025, 21 pages.

Application No. CN202180065635.8 , Office Action, Mailed on Dec. 20, 2025, 7 pages.

Application No. SG11202302033U , Written Opinion, Mailed On Feb. 5, 2026, 7 pages.

* cited by examiner

PRIVACY-PRESERVING IDENTITY DATA EXCHANGE

CROSS-REFERENCES TO RELATED APPLICATIONS

This application is a National Stage of International Application No. PCT/US2021/052380 filed on Sep. 28, 2021, which claims priority to and the benefit of U.S. Provisional Patent Application No. 63/104,723, filed on Oct. 23, 2020, and U.S. Provisional Patent Application No. 63/109,566, filed on Nov. 4, 2020, which are herein incorporated by reference.

BACKGROUND

Interactions between users and relying parties may require the user to provide personal data to the relying party. For example, a transaction between a user and a merchant for restricted goods such as alcohol may require the user to present an ID card to confirm that the user is above the legal drinking age. By revealing the ID card, the user may reveal more data than is necessary to the merchant. For example, the user only needed to reveal their date of birth, but the ID card may additionally display the full name of the user, the address of the user, or other personal data that the user may not wish to share. Additionally, the date of birth itself may not be required if an attestation of the date of birth was provided instead, further preserving the privacy of the user's personal data.

The user may be required to keep many such ID cards to prove their identity to relying parties. Government issued ID cards may provide personal data necessary for many interactions, but other ID cards may provide different personal data of the user that can be required for other interactions. For example, the user may have a library card that has a library account number which would be required only at the specific issuing library. The use of many such ID cards may be cumbersome to the user.

Embodiments of the disclosure address this problem and other problems individually and collectively.

SUMMARY

One embodiment of the invention includes a method. The method comprising: receiving, by a digital identity computer, a request for personal data associated with a user comprising a first public key associated with a relying party or derivative thereof; retrieving, by a digital identity computer, encrypted personal data associated with the user, wherein the personal data is encrypted with a second public key associated with the user; encrypting, by the digital identity computer, the encrypted personal data with the first public key associated with a relying party or derivative thereof to form subsequently encrypted personal data; and transmitting, by the digital identity computer, the subsequently encrypted personal data or derivative thereof to a (i) relying party computer, or (ii) a user device associated with the user and wherein the user device, which thereafter transmits the subsequently encrypted personal data or derivative thereof to the relying party computer, wherein in after either (i) or (ii), the relying party computer obtains the personal data from the subsequently encrypted personal data or derivative thereof.

Another embodiment is related to a digital identity computer comprising: a processor; and a non-transitory computer readable medium comprising instructions executable by the processor to perform operations including: receiving, by a digital identity computer, a request for personal data associated with a user comprising a first public key associated with a relying party or derivative thereof; retrieving, by a digital identity computer, encrypted personal data associated with the user, wherein the personal data is encrypted with a second public key associated with the user; encrypting, by the digital identity computer, the encrypted personal data with the first public key associated with a relying party or derivative thereof to form subsequently encrypted personal data; and transmitting, by the digital identity computer, the subsequently encrypted personal data or derivative thereof to a (i) relying party computer, or (ii) a user device associated with the user and wherein the user device, which thereafter transmits the subsequently encrypted personal data or derivative thereof to the relying party computer, wherein in after either (i) or (ii), the relying party computer obtains the personal data from the subsequently encrypted personal data or derivative thereof.

Yet another embodiment is related to a method comprising: initiating, by a user device, a request for personal data associated with the user operating the user device, wherein a relying party computer communicating with the user device transmits the request for personal data to a digital identity computer, the request comprising a first public key associated with the relying party operating the relying party computer or derivative thereof; and transmitting, by the user device to the digital identity computer, consent for the personal data to be shared with the relying party, wherein thereafter the digital identity computer completes the request for personal data associated with the user by: encrypting, by the digital identity computer, the encrypted personal data with the first public key associated with a relying party or derivative thereof to form subsequently encrypted personal data; and transmitting, by the digital identity computer, the subsequently encrypted personal data or derivative thereof to a (i) relying party computer, or (ii) a user device associated with the user and wherein the user device, which thereafter transmits the subsequently encrypted personal data or derivative thereof to the relying party computer, wherein in after either (i) or (ii), the relying party computer obtains the personal data from the subsequently encrypted personal data or derivative thereof.

A better understanding of the nature and advantages of embodiments of the invention may be gained with reference to the following detailed description and accompanying drawings.

DETAILED DESCRIPTION

Figure 1:
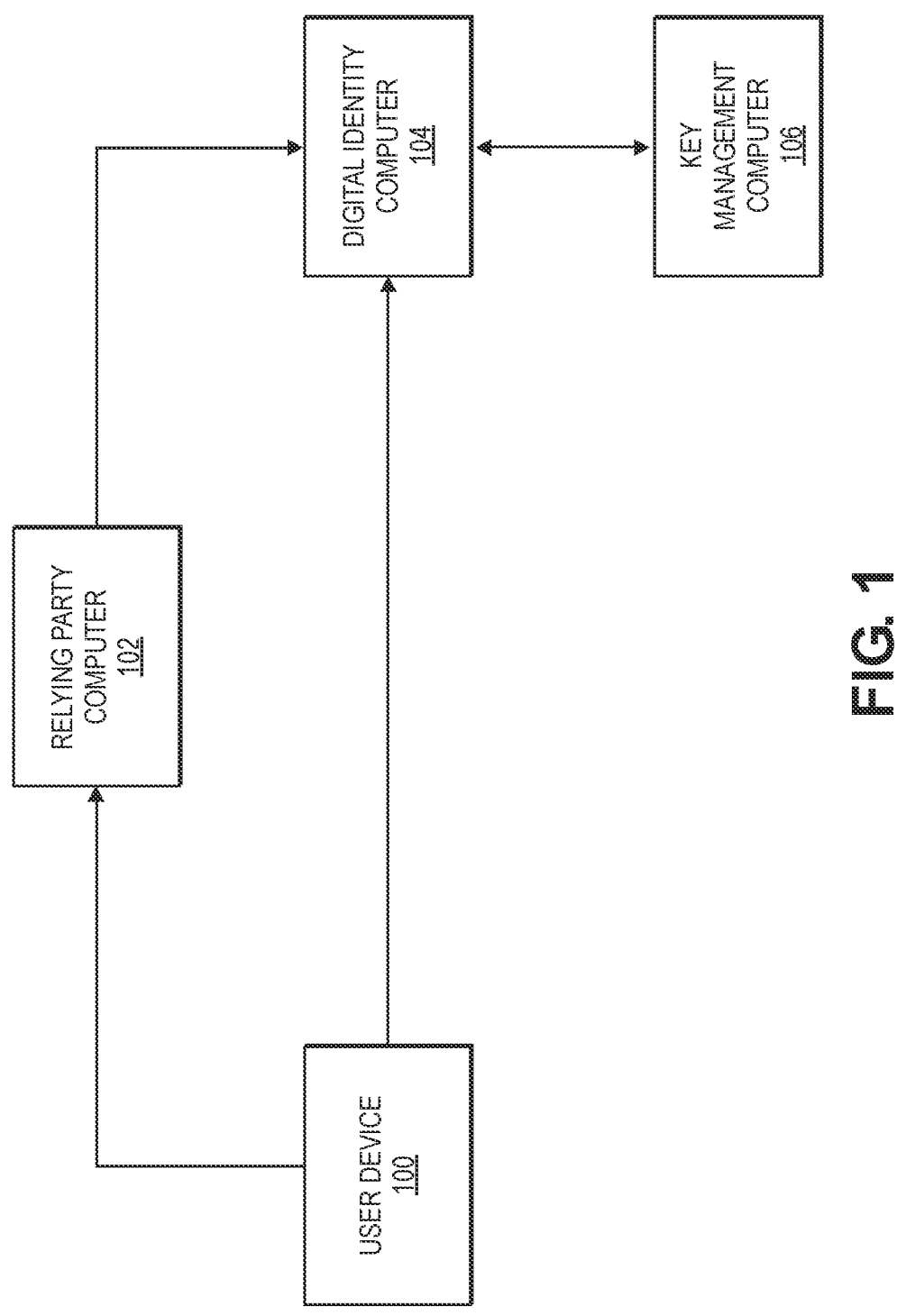
FIG. 1 shows a block diagram of a privacy preserving system according to embodiments of the invention.

Prior to discussing embodiments of the disclosure, some terms can be described in further detail.

A "user" may include an individual. In some embodiments, a user may be associated with one or more personal accounts and/or mobile devices. The user may also be referred to as a cardholder, account holder, or consumer in some embodiments.

A "user device" may be a device that is operated by a user. Examples of user devices may include a mobile phone, a smart phone, a card, a personal digital assistant (PDA), a laptop computer, a desktop computer, a server computer, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "resource provider" can be any suitable entity that provides resources (e.g., goods, services, access to secure data, access to locations, or the like) during a transaction. For example, a resource providing entity can be a merchant, a venue operator, a building owner, a governmental entity, etc. A "merchant" may typically be an entity that engages in transactions and can sell goods or services, or provide access to goods or services.

"Personal data" may be data that is associated with a specific user. Personal data of a user may provide information of the user or things of the user. Examples of personal data may be the name of the user, the birthdate of the user, contact information (e.g., email addresses, phone numbers, IP addresses, etc.) of the user, the home address of the user, account numbers of accounts associated the user (e.g., bank account numbers, student ID numbers, etc.), etc. In some embodiments, personal data may refer to attestations of raw personal data. For example, personal data may be a data of birth such as 01-01-1970, but an attestation saying "USER IS ABOVE 21 YEARS OLD" may also be referred to as personal data.

A "policy token" may include data that serves as a substitute for a policy or regulation. For example, a liquor store may have a policy that they do not sell alcohol to anyone under 21. A policy token may serve as a digital substitute for this policy. Policy tokens may be used to automatically enact the policies that they substitute. For example, a policy token may be used by one or more computer systems to verify that a user is over 21, when traditionally a human store clerk or attendant would enact this verification policy. A policy token may comprise one or more predicates.

A "predicate" may include any data that is used as the basis for other data. For example, a predicate may form the basis for a zero-knowledge proof, in that the zero-knowledge proof is generated based on the predicate or its contents. A predicate can correspond to a query, such as "is User A over 21 years old?" An entity can generate a zero-knowledge proof based on this predicate, which proves "Yes, User A is over 21 years old." Predicates can be stored in a policy token, and one or more predicates can be used to implement a policy, such as an age verification policy for a liquor store.

FIG. 1 shows a block diagram of a privacy preserving system according to embodiments of the invention. The privacy preserving system may comprise a user device 100 operated by a user (not shown). The user device 100 may communicate with a relying party computer 102 operated by a relying party such as a merchant, and a digital identity computer 104 operated by a processing network (e.g., a payment processing network). The relying party computer 102 and the digital identity computer 104 may also communicate with each other. The processing network operating the digital identity computer 104 may additionally operate a key management computer 106, or the digital identity computer 104 may comprise the key management computer 106. The key management computer 106 may communicate with the digital identity computer 104 to provide cloud-based key management for the user device 100 and the relying party computer 102. The digital identity computer 104 may comprise a ciphertext database (not shown in FIG. 1), and the key management computer 106 may be comprise a key database (not shown in FIG. 1). The ciphertext database may store personal data related to the user (e.g., identity data such as the date of birth of the user, the home address of the user, account numbers of the user, etc.) in encrypted form. The key database may store encryption keys (e.g., public and secret keys associated with the user, and public keys associated with the relying party).

The components in the identity token system 100 of FIG. 1 and any of the following figures can be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); and Secure Hypertext Transfer Protocol (HTTPS).

The privacy preserving system of system of FIG. 1 can allow the user to provide personal data to the relying party, or attestations of personal data (e.g., an indication that the user belongs in some group, such as "user is above 21 years old"). The digital identity computer 104 securely stores personal data associated with a plurality of users in encrypted form, but does not learn anything about the plaintext personal data. Several embodiments allow the digital identity computer 104 to provide the personal data, or attestations of the personal data to the relying party computer 102 upon request.

Figure 2:
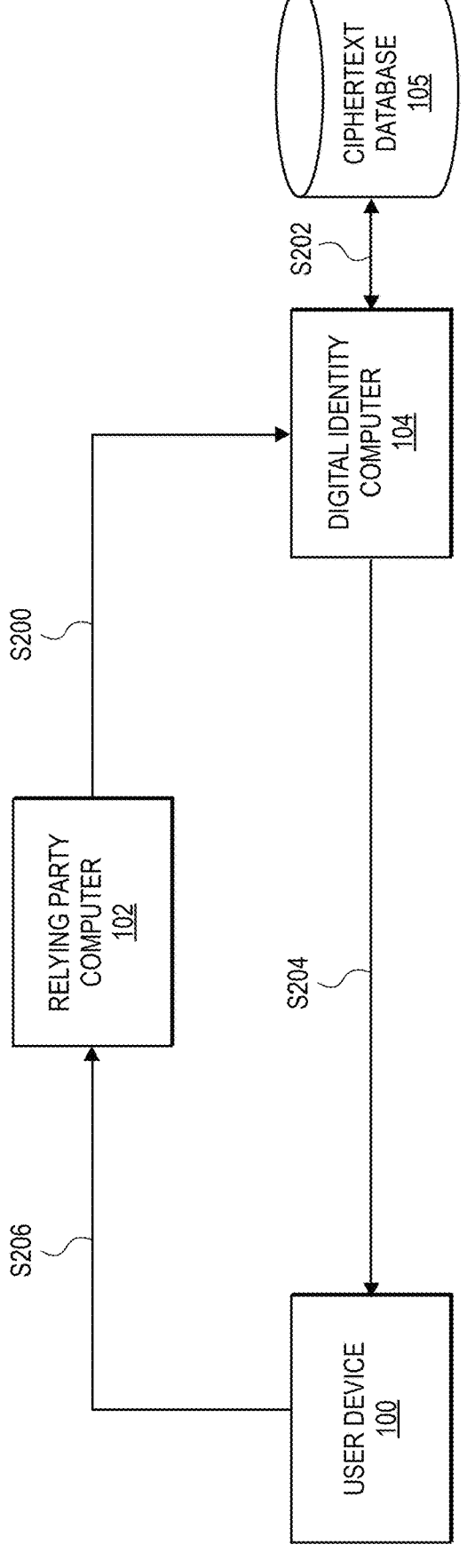
FIG. 2 shows a block diagram and flow of a privacy preserving system using a public key encryption scheme.

FIG. 2 shows a block diagram and flow of a privacy preserving system using a public key encryption scheme. In the example of FIG. 2, the user device 100 and the relying party computer 102 generate encryption key pairs using any suitable asymmetric commutative encryption scheme, such as those discussed in Adi Shamir, et. al., "Mental Poker" in the The Mathematical Gardner., Editor, David A. Klarner, Springer, Boston, MA. (1981) doi: 10.1007/978-1-4684-6686-7_5, or Andre Gustavo Degraf Uchoa, et. al., "A Three-Pass Protocol for Cryptography Based on Padding for Wireless Networks," 2007 $4^{th}$ IEEE Consumer Communications and Networking Conference, 2007, pp. 287-291, doi: 10.1109/CCNC.2007.63, which are herein incorporated by reference in its entirety. A commutative encryption scheme allows the decryption of doubly-encrypted data to occur in any order.

In embodiments of the invention, the user device 100 may generate a user public key $pk_u$, and a user secret key $sk_u$, and the relying party computer 102 may generate a relying party public key $pk_r$, and a relying party secret key $sk_r$.

The user device 100, or an identity provider computer (not shown) operated by an identity provider (e.g., a governmental agency, a financial institution, etc.) may encrypt personal data associated with the user. The personal data may be in the form of raw personal data (e.g., a date of birth such as 01/01/1970) or in the form of attestations about the raw personal data (e.g., the user is above 21 years old). The encrypted personal data may be transmitted to the digital identity computer 104 for storage, where the digital identity computer 104 may store the encrypted personal data in memory, or in the ciphertext database 105. In some embodiments, the encrypted personal data may be additionally encrypted by a long-term public key, which may be decrypted using a long-term secret key before performing any operations on the encrypted personal data. The ciphertext database 105 may be accessed (e.g., using a user identifier such as a username, name of the user, email address, IP address, phone number, account number, etc.) at a later time by the digital identity computer 104 to retrieve the encrypted personal data.

In embodiments of the invention, the user operating the user device 100 may interact with a relying party operating the relying party computer 102. For example, the user may wish to purchase restricted goods, such as alcohol, which require the user to provide personal data to the relying party such as their date of birth. Other examples may include the user wishing to access special discounts, such as those available to students, seniors, military personnel, or residents of a certain area, that require the user to prove they are part of the eligible group (e.g., providing a student email, military ID card, postal code, etc.). The user or the user device 100 may indicate that the user has an account at the digital identity computer 104, and may provide a user identifier to the relying party computer 102.

In step S200, the relying party computer 102 may transmit a request for personal data associated with the user and the relying party public key $pk_r$, to the digital identity computer 104. The request may comprise an indication of the type of personal data requested, and the user identifier. For example, the relying party computer 102 may transmit a request for the date of birth of the user with the user identifier "example@email.com".

In step S202, after receiving the request for personal data and the relying party public key $pk_r$, from the relying party computer 102, the digital identity computer 104 may access the ciphertext database 105 using the user identifier to retrieve the encrypted personal data associated with the user (e.g., the encrypted personal data encrypted by the user public key may be represented by $Enc(pk_u; data)$). The digital identity computer 104 may then encrypt the encrypted personal data with the relying party public key $pk_r$, to form subsequently encrypted personal data (e.g., doubly-encrypted data $Enc(pk_r; (Enc(pk_u; data)))$).

In step S204, after forming the subsequently encrypted personal data, the digital identity computer 104 may transmit the subsequently encrypted personal data to the user device 100.

After receiving the subsequently encrypted personal data, the user device 100 may use the user secret key associated with the user public key to remove a layer of encryption from the subsequently encrypted personal data to form modified subsequently encrypted personal data. The modified subsequently encrypted personal data may be an example of a derivative of the subsequently encrypted personal data. For example, the user device 100 may use the user secret key to remove the user layer of encryption so that the subsequently encrypted personal data only retains the relying party layer of encryption (e.g., $Dec(sk_u;(Enc(pk_r; (Enc(pk_u; data)))))=Enc(pk_r; data))$.

In step S206, after forming the modified subsequently encrypted personal data, the user device 100 may then transmit the modified subsequently encrypted personal data to the relying party computer 102.

After receiving the modified subsequently encrypted personal data from the user device 100, the relying party computer 102 may remove the relying party level of encryption to retrieve the personal data. The personal data may then be used by the relying party to complete the interaction with the user, such as allowing the user to purchase alcohol if the personal data indicated that the user was above 21 years old or providing a student discount on a purchase.

Figure 3:
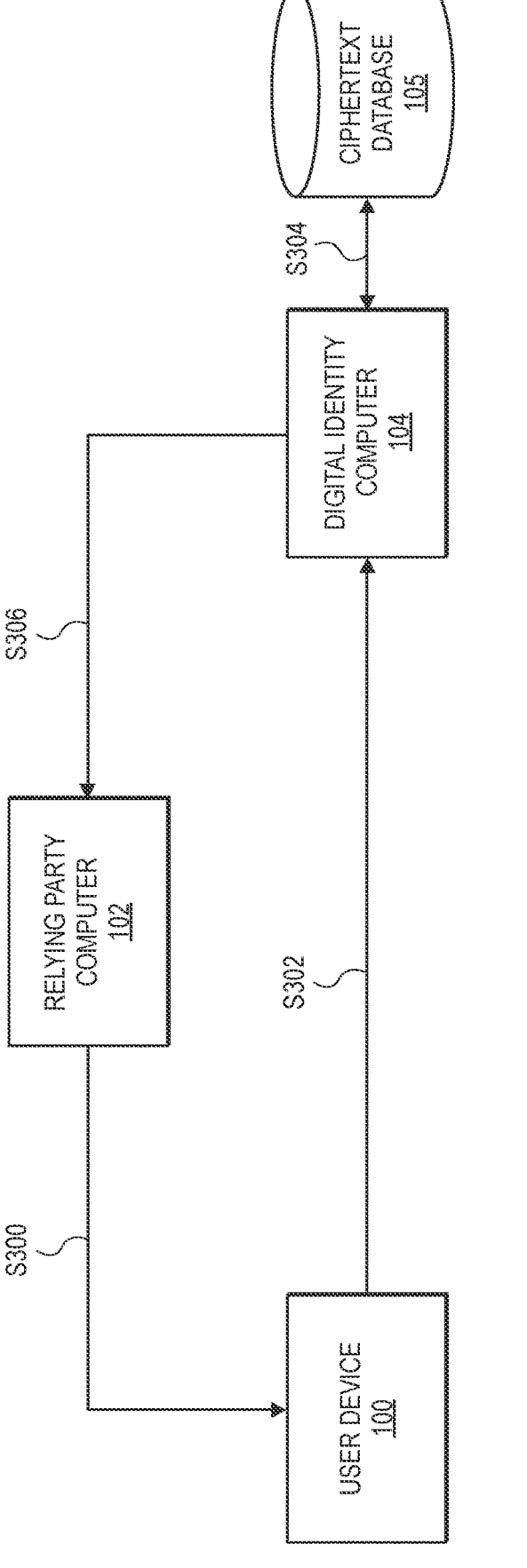
FIG. 3 shows a block diagram and flow of a privacy preserving system using a proxy re-encryption scheme.

FIG. 3 shows a block diagram and flow of a privacy preserving system using a proxy re-encryption scheme. The user device 100, relying party computer 102, digital computer 104, and ciphertext database 105 may hold encryption keys and data similar to the data described in FIG. 2. The system of FIG. 3 uses a proxy re-encryption scheme which is a cryptographic tool that allows for the re-encryption of ciphertexts from one encryption key to another. An example of a proxy re-encryption scheme may be found in Benoit Libert and Damien Vergnaud, "Unidirectional Chosen-Ciphertext Scure Proxy Re-Encryption," IEEE Trans. Inf. Theory, 57(3):1786-1802, 2011, which is herein incorporated by reference in its entirety.

In step S300, the relying party computer 102 may transmit a request for personal data associated the user and the relying party public key $pk_r$, to the user device 100. The request may comprise an indication of the type of personal data requested. For example, the relying party computer 102 may transmit a request for the date of birth of the user.

In step S302, after receiving the request for personal data from the relying party computer 102, the user device 100 may compute a re-encryption key $rk_{u \rightarrow r}$ using the user secret key $sk_u$ and the relying party public key $pk_r$. The re-encryption key $rk_{u \rightarrow r}$ may be an example of a derivative of the relying party public key. The re-encryption key $rk_{u \rightarrow r}$ may replace the user layer of encryption on the encrypted personal data with a relying party layer of encryption (e.g., $REnc(rk_{u \rightarrow r}; Enc(pk_u; data))=Enc(pk_r; data))$. The user device 100 may then transmit the request for personal data, the re-encryption key $rk_{u \to r}$ and a user identifier to the digital identity computer 104.

In step S304, after receiving the request for personal data, the re-encryption key $rk_{u \to r}$ and the user identifier from the user device 100, the digital identity computer 104 may access the ciphertext database 105 with the user identifier to retrieve encrypted personal data associated with the user. The digital identity computer 104 may then re-encrypt the encrypted personal data by applying the re-encryption key $rk_{u \to r}$ to the encrypted personal data to form subsequently encrypted personal data. The subsequently encrypted personal data may be the requested personal data associated with the user, encrypted solely under the relying party public key.

In step S306, after forming the subsequently encrypted personal data, the digital identity computer 104 may transmit the subsequently encrypted personal data to the relying party computer 102.

After receiving the modified subsequently encrypted personal data from the digital identity computer 104, the relying party computer 102 may remove (decrypt) the relying party layer of encryption using the relying party private key to retrieve the personal data. The personal data may then be used by the relying party to complete the interaction with the user, such as allowing the user to purchase alcohol if the personal data indicated that the user was above 21 years old or providing a student discount on a purchase.

Figure 4:
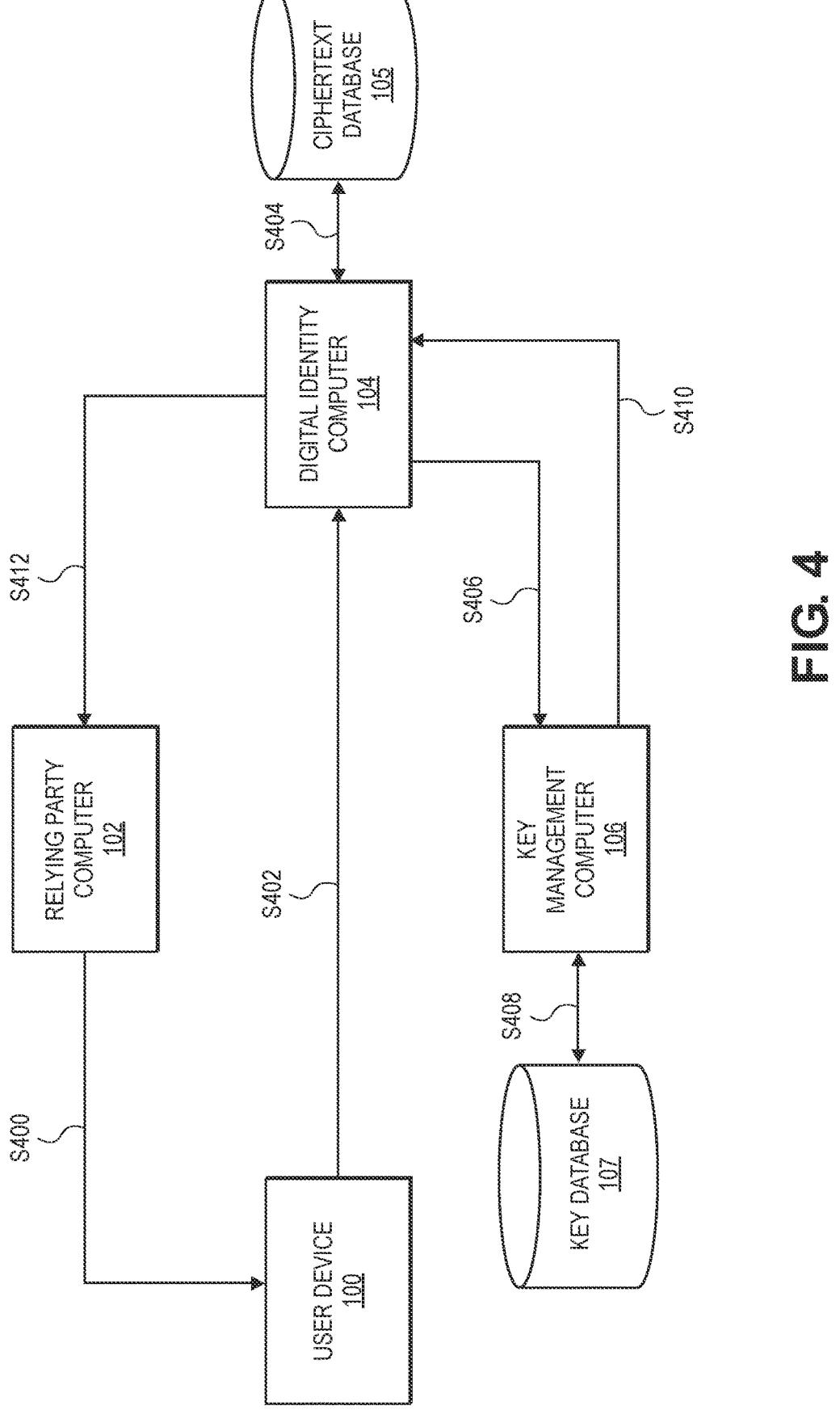
FIG. 4 shows a block diagram and flow of a privacy preserving system using a public key encryption scheme and cloud-based key management.

FIG. 4 shows a block diagram and flow of a privacy preserving system using a public key encryption scheme and cloud-based key management. The user device 100, and the relying party computer 102 may generate commutative encryption keys similar to the previously described in FIG. 2. However, a key management computer 106 may store the user public key and the user secret key in a key database 107. The key management computer 106 may perform cryptographic operations (e.g., decryption, encryption, etc.) that would previously be performed on the user device 100 in FIG. 2.

In step S400, the relying party computer 102 may transmit a request for personal data associated the user and the relying party public key $pk_r$ to the user device 100. The request may comprise an indication of the type of personal data requested. For example, the relying party computer 102 may transmit a request for the date of birth of the user.

In step S402, after receiving the request for personal data from the relying party computer 102, the user may consent to sharing the personal data with the relying party using the user device 100. For example, the user device 100 may prompt the user by displaying a consent request including the indication of personal data that will be shared with the relying party. After the user approves the consent request, the user device 100 may then transmit the request for personal data, the relying party public key $pk_r$, and a user identifier to the digital identity computer 104.

In step S404, after receiving the request for personal data and the user identifier from the user device 100, the digital identity computer 104 may access the ciphertext database 105 with the user identifier to retrieve encrypted personal data associated with the user. The digital identity computer 104 may then encrypt the encrypted personal data with the relying party public key $pk_r$ to form subsequently encrypted personal data (e.g., doubly-encrypted data $Enc(pk_r; (Enc(pk_u; data)))$.

In step S406, after forming the subsequently encrypted personal data, the digital identity computer 104 may transmit the subsequently encrypted personal data and the user identifier to the key management computer 106.

In step S408, after receiving the subsequently encrypted personal data and the user identifier from the digital identity computer 104, the key management computer 106 may access the key database 107 using the user identifier to retrieve the user secret key. The key management computer 106 may then use the user secret key associated with the user public key to remove a layer of encryption from the subsequently encrypted personal data to form modified subsequently encrypted personal data. The modified subsequently encrypted personal data may be an example of a derivative of the subsequently encrypted personal data. For example, the key management computer 106 may use the user secret key to remove the user layer of encryption so that the subsequently encrypted personal data only retains the relying party level of encryption (e.g., $Dec(sk_u;(Enc(pk_r; (Enc(pk_u; data)))))=Enc(pk_r; data))$.

In step S410, after forming the modified subsequently encrypted personal data, the key management computer 106 may then transmit the modified subsequently encrypted personal data to the digital identity computer 104.

In step S412, after receiving the modified subsequently encrypted personal data from the key management computer 106, the digital identity computer 104 may transmit the modified subsequently encrypted personal data (e.g., a derivative of the subsequently encrypted personal data) to the relying party computer 102.

After receiving the modified subsequently encrypted personal data from the digital identity computer 104, the relying party computer 102 may remove the relying party level of encryption (using a relying party secret key) to retrieve the personal data. The personal data may then be used by the relying party to complete the interaction with the user, such as allowing the user to purchase alcohol if the personal data indicated that the user was above 21 years old or providing a student discount on a purchase.

Figure 5:
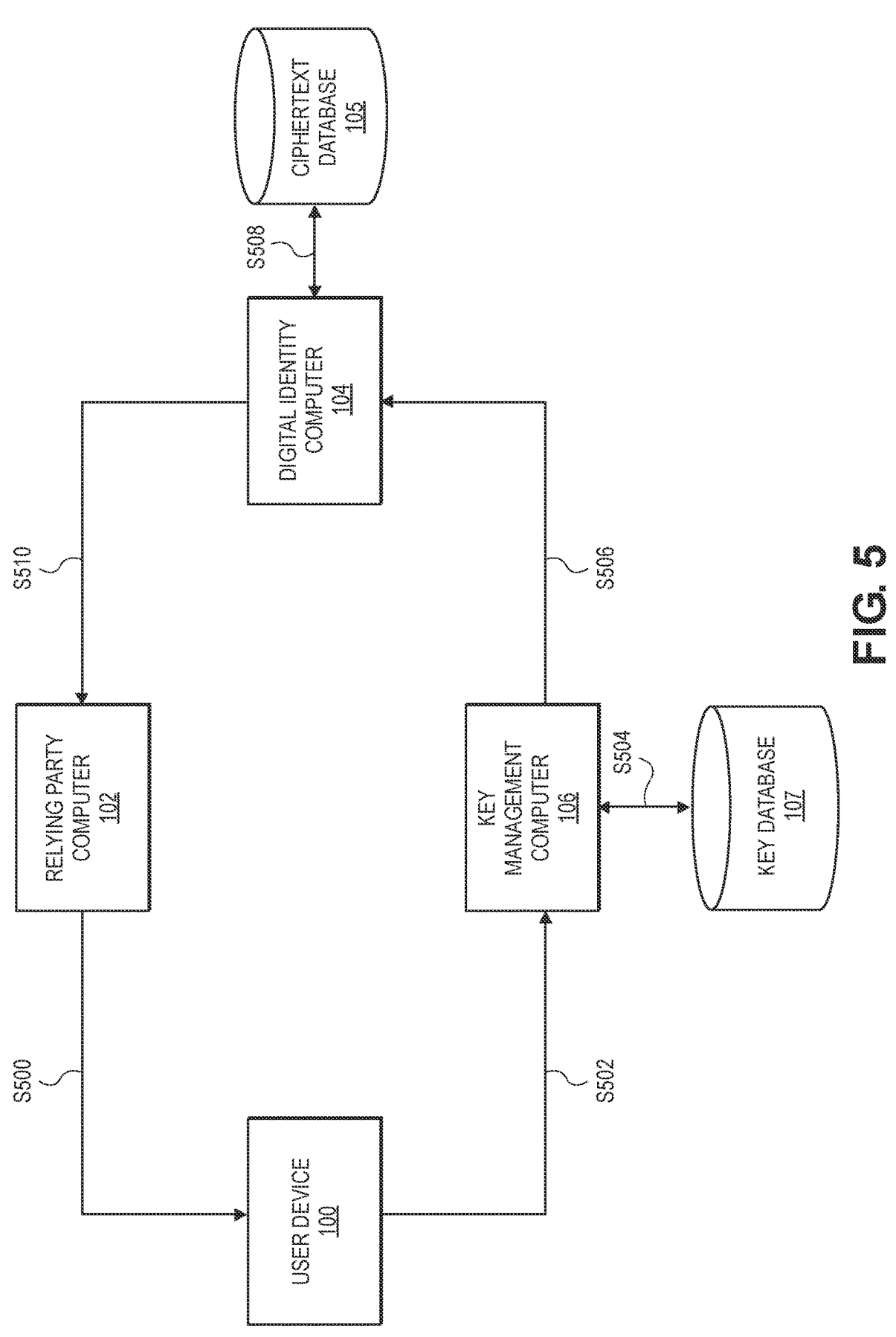
FIG. 5 shows a block diagram and flow of a privacy preserving system using a proxy re-encryption scheme and cloud-based key management.

FIG. 5 shows a block diagram and flow of a privacy preserving system using a proxy re-encryption scheme and cloud-based key management. The system described in FIG. 5 may use a proxy re-encryption scheme similar to the proxy re-encryption scheme described in FIG. 3 along with the cloud-based key management provided by the key management computer 106 described in FIG. 4. However, the key management computer 106 may further store the relying party public key in the key database 107.

In step S500, the relying party computer 102 may transmit a request for personal data associated the user to the user device 100. The request may comprise an indication of the type of personal data requested. For example, the relying party computer 102 may transmit a request for the date of birth of the user.

In step S502, after receiving the request for personal data from the relying party computer 102, the user may consent to sharing the personal data with the relying party using the user device 100. For example, the user device 100 may prompt the user by displaying a consent request including the indication of personal data that will be shared with the relying party. After the user approves the consent request, the user device 100 may then transmit the request for personal data and a user identifier to the key management computer 106.

In step S504, after receiving the request for personal data and the user identifier from the user device 100, the key management computer 106 may access the key database 107 using the user identifier to retrieve the user secret key and the relying party public key. The key management computer

106 may then compute a re-encryption key $rk_{u \to r}$ using the user secret key $sk_u$ and the relying party public key $pk_r$. The re-encryption key $rk_{u \to r}$ may be an example of a derivative of the relying party public key. The re-encryption key $rk_{u \to r}$ may replace the user layer of encryption on the encrypted personal data with a relying party layer of encryption (e.g., $REnc(rk_{u \to r}; Enc(pk_u; data)) = Enc(pk_r; data))$.

In step S506, after generating the re-encryption key $rk_{u \to r}$, the key management computer 106 may then transmit the request for personal data, the re-encryption key $rk_{u \to r}$, and the user identifier to the digital identity computer 104.

In step S508, after receiving the request for personal data, the re-encryption key $rk_{u \to r}$ and the user identifier from the key management computer 106, the digital identity computer 104 may access the ciphertext database 105 with the user identifier to retrieve encrypted personal data associated with the user. The digital identity computer 104 may then re-encrypt the encrypted personal data by applying the re-encryption key $rk_{u \to r}$ to the encrypted personal data to form subsequently encrypted personal data. The subsequently encrypted personal data may be the requested personal data associated with the user, encrypted solely under the relying party public key.

In step S510, after forming the subsequently encrypted personal data, the digital identity computer 104 may transmit the subsequently encrypted personal data to the relying party computer 102.

After receiving the modified subsequently encrypted personal data from the digital identity computer 104, the relying party computer 102 may remove the relying party level of encryption to retrieve the personal data. The personal data may then be used by the relying party to complete the interaction with the user, such as allowing the user to purchase alcohol if the personal data indicated that the user was above 21 years old or providing a student discount on a purchase.

Embodiments described by FIGS. 2, 3, 4, and 5 provide a number of advantages. The digital identity computer 104 provides access to personal data or attestations of personal data associated with the user operating the user device 100 to the relying party via the relying party computer 102. The digital identity computer 104 does not however learn anything about the personal data of the user. The digital identity computer 104 never interacts with the plaintext personal data, and only sees the personal data in encrypted, or doubly-encrypted form. The user device 100 additionally does not need to store any plaintext personal data, enhancing the security of the personal data as the risk of loss for a user device 100 is often greater than the risk of the digital identity computer 104 and the key management computer 106 both being compromised by an external attacker. FIGS. 4 and 5 further perform cryptographic operations on ciphertext via the key management computer 106, and lessen the requirement on the functions of the user device 100. While the processes described in FIGS. 2 and 3 may require a dedicated mobile application to perform cryptographic operations, FIGS. 4 and 5 describe two other processes such that those cryptographic operations are performed by the key management computer 106 instead.

The processes described by FIGS. 2-5 may be implemented using applications installed on the user device. An application such as a digital identity application may perform functions to complete the above processes. The digital identity application may store various accounts of the user, similar to how a digital application stores payment credentials of the user. For example, the digital identity application may store transit accounts (e.g., transit cards such as bus passes, train passes, etc.), bank accounts (e.g., payment cards such as credit cards and debit cards), and identity accounts (e.g., identity cards such as student ID cards, military ID cards, or general identity information provided by an identity provider). One implementation of a system is described in the following FIGS. 6-9.

Figure 6:
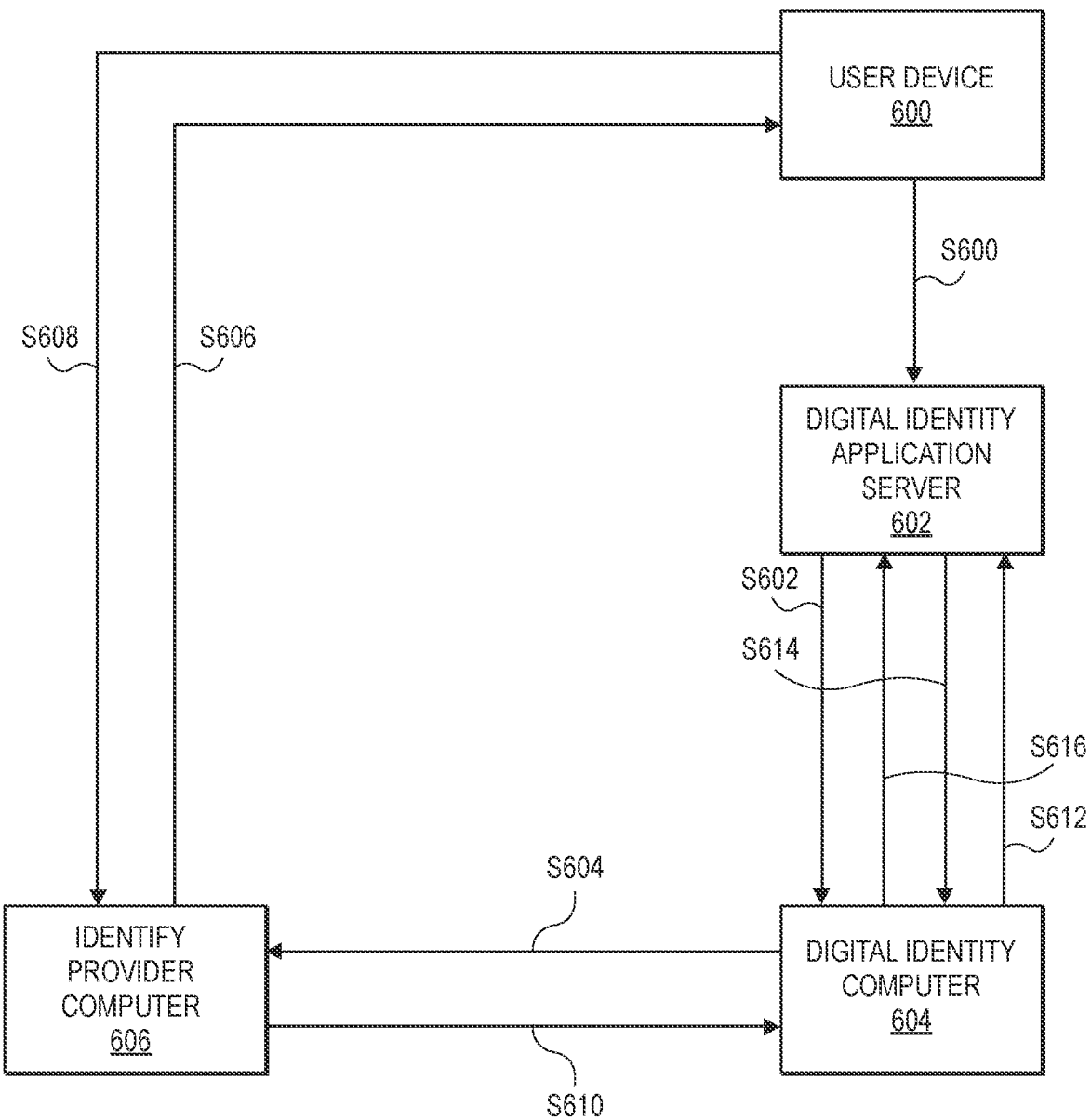
FIG. 6 shows a block diagram and flow of a user provisioning personal data to a digital identity application on a user device.

FIG. 6 shows a block diagram and flow of a user provisioning personal data to a digital identity application on a user device 600. The user operating the user device 600 may wish to provision identity information from an identity provider into the digital identity application installed on the user device 600. The digital identity application may have a digital identity application server 602 associated with it, which may route communications to and from the digital identity application. Examples of identity providers may be governmental institutions, educational institutions such as universities or colleges, financial institutions such as banks or payment processing networks that can provide personal data of the user.

In step S600, the user may input one or more identity providers from which they wish to provision personal data from into the digital identity application on the user device 600. For example, the user may select, from a list displayed on the user device 600, a bank and personal data they want to be provisioned from the bank, such as name, account number, and date of birth.

In step S602, after the user inputs the desired identity provider(s) and personal data, the digital identity application server 602 may transmit the list of one or more identity providers and personal data to the digital identity computer 604.

In step S604, after receiving the list of one or more identity providers from the digital identity application server 602, the digital identity computer 604 may transmit a provisioning request to each of the identity providers in the list. For example, the digital identity computer 604 may transmit a provisioning request to the identity provider computer 606. The provisioning request may comprise the personal data the user wishes to provision, along with a device identifier (e.g., a phone number, e-mail address, etc.) of the user device.

In step S606, after receiving the provisioning request from the digital identity computer 604, the identity provider computer 606 may transmit an authentication request to the user device 600. An example of an authentication request for a university may be transmitting an email to the student's email address which may comprise a link that may be clicked on to authenticate the user. A bank may authenticate the user by sending a prompt for a secret to the user device 600 via a bank application installed on the user device 600. In-person authentications may also occur.

In step S608, after receiving the authentication request, the user may respond to the authentication request using the user device 600. For example, as described above, the user may click on a prompt displayed on the user device 600 which allows the user to respond to the authentication request. The user may authenticate themselves by correctly responding to the authentication request and provide consent to sharing personal data with the digital identity application server 602. The user device 600 may then transmit the user's consent to the identity provider computer 606.

In step S610, after receiving the user's consent from the user device 600, the identity provider computer 606 may provide access to the personal data to the digital identity computer 604. For example, the identity provider computer 606 may provide an authentication token that can be used to access the personal data.

In another example, the identity provider computer 606 may provide the personal data encrypted under a public key associated with the digital identity application (e.g., a user public key) to the digital identity computer 604. In the case that an authentication token was provided, the personal data may be encrypted under an identity provider public key. The digital identity computer 604 may store the encrypted personal data, or the authentication token in memory.

In step S612, after receiving the encrypted personal data or the authentication token from the identity provider computer 606, the digital identity computer 604 may transmit the indications of the personal data that was provisioned to the digital identity application server 602.

After receiving the indications of the personal data, the digital identity application server 602 may transmit the indications to the digital identity application on the user device 600. The user may request to view the personal data on the digital identity application by providing consent for the digital wallet application to access the personal data.

In step S614, after the user requests to view the personal data on the digital identity application, the digital identity application server 602 may transmit the request for the personal data to the digital identity computer 604.

In step S616, after receiving the request for personal data from the digital identity application server 602, the digital identity computer 604 may provide access to the personal data to the digital identity application via the digital identity application server 602. For example, the digital identity computer 604 may transmit the personal data encrypted under the user public key. If the digital identity computer 604 was given the authentication token, the digital identity computer 604 may first transmit the authentication token to the identity provider computer 606, so that the identity provider computer 606 may provide the personal data encrypted under the user public key.

After the digital identity application receives the encrypted personal data, the user device 600 may decrypt the encrypted personal data by using a secret key corresponding to the public key. The user device 600 may then display the personal data to the user. In other embodiments, the user may then use the digital identity application to interact with a relying party as was described in a similar manner to the previously described FIGS. 2-5.

Figure 7:
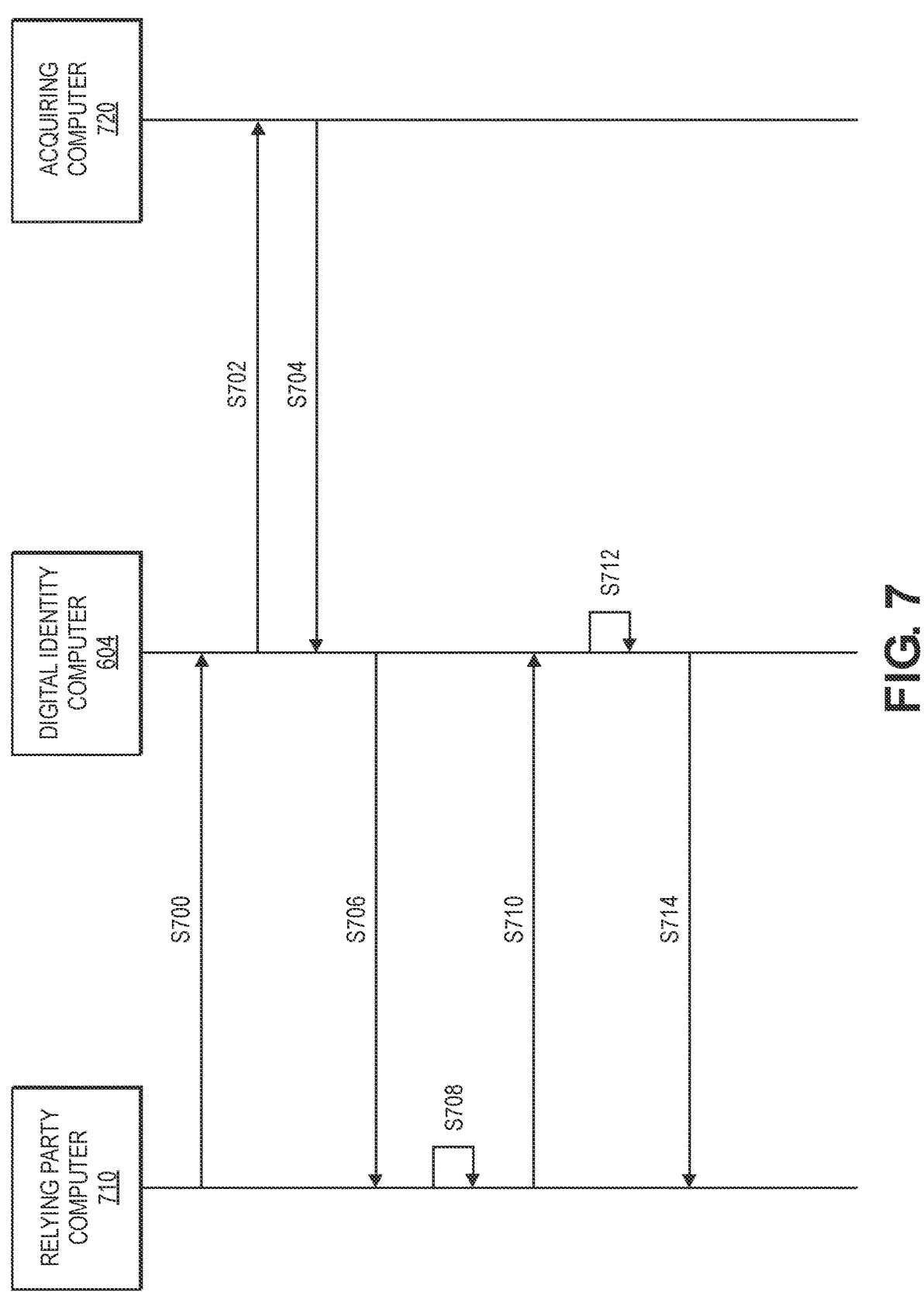
FIG. 7 shows a flow diagram of a relying party computer onboarding with a digital identity computer.

FIG. 7 shows a flow diagram of a relying party computer 710 onboarding with a digital identity computer 604. The relying party computer 710 may onboard with the digital identity computer 604 so that they may perform interactions with users on the registered with the digital identity computer 604.

In step S700, the relying party computer 710 may transmit an onboarding request message to the digital identity computer 604. The onboarding request message may comprise an identifier that identifies the relying party operating the relying party computer 710, such as a name, employer identification number, etc.

In an optional step S702, after receiving the onboarding request message from the relying party computer 710, the digital identity computer 604 may transmit a vetting request to an acquirer computer 720. The vetting request may be a request to the confirm the identity of the relying party, and may contain the identifier that the relying party computer 710 provided. The acquirer computer 720 may complete some verification process to confirm the identity of the relying party.

In an optional step S704, after completing the verification process, the acquirer computer 720 may transmit the result to the digital identity computer 604. The digital identity computer 604 may proceed if the identity of the relying party was confirmed.

In step S706, after receiving the onboarding request message and optionally completing the verification of the relying party, the digital identity computer 604 may transmit a request for a relying party public key to the relying party computer 710.

In step S708, after receiving the request for the relying party public key, the relying party computer 710 may generate an encryption key pair using any suitable asymmetric commutative encryption scheme. The relying party computer 710 may use the asymmetric commutative encryption scheme to generate a relying party public key and a relying party secret key.

In step S710, after generating the encryption key pair, the relying party computer 710 may then store the resultant relying party secret key, and transmit the relying party public key to the digital identity computer 604.

In step S712, after receiving the relying party public key, the digital identity computer 604 may generate a policy token. The policy token may allow the relying party computer 710 to complete personal data requests.

In step S714, after generating the policy token, the digital identity computer 604 may transmit the policy token to the relying party computer 710.

Figure 8:
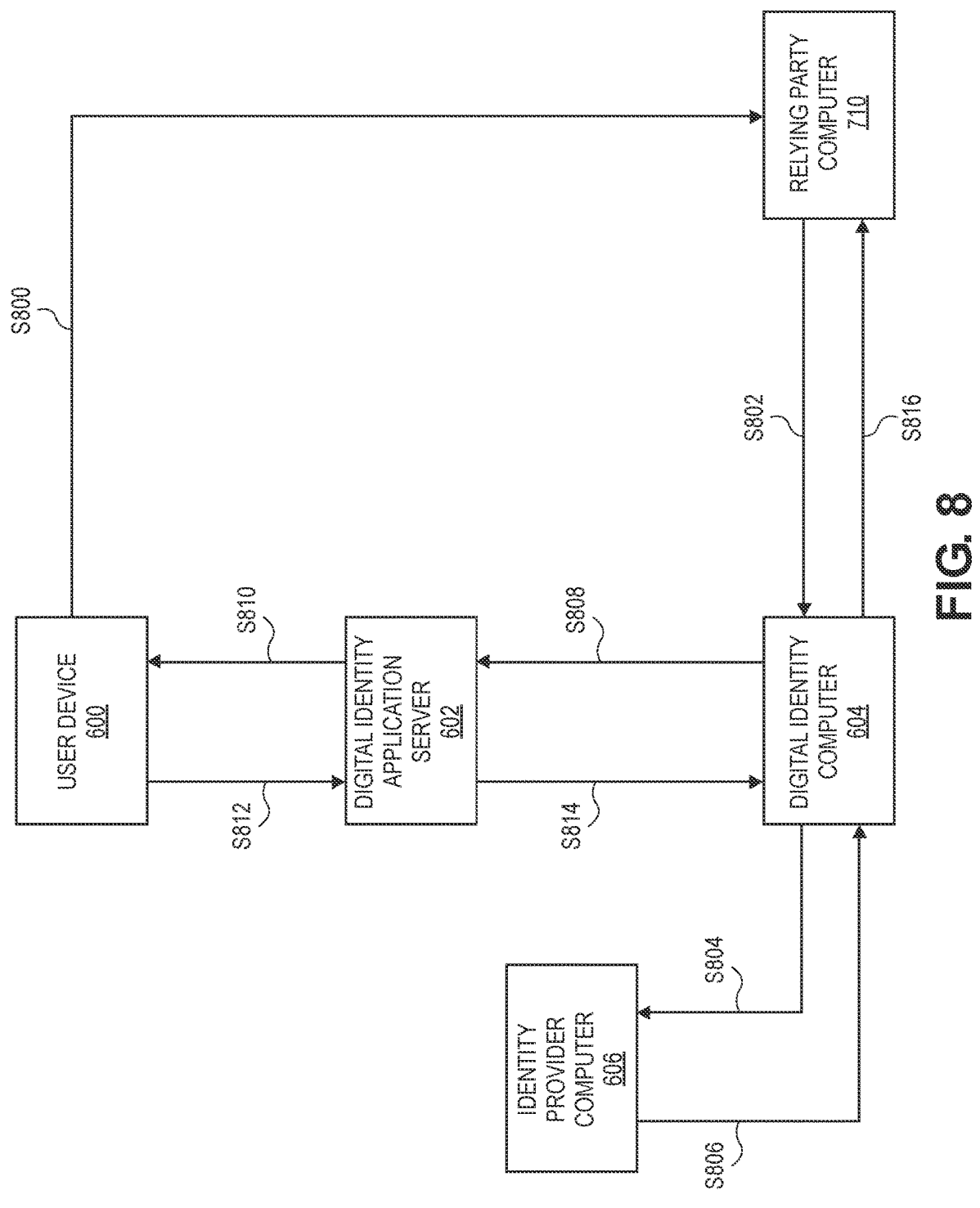
FIG. 8 shows a block diagram and flow of a user providing a relying party computer access to personal data associated with the user.

FIG. 8 shows a block diagram and flow of a user providing a relying party computer 710 access to personal data associated with the user. The user may interact with the relying party computer 710 using a user device 600. The process shown in FIG. 8 may be completed after both the user and the relying party register with the digital identity computer (e.g., after the flows shown by FIG. 6 and FIG. 7 are completed).

In step S800, the user may begin an interaction with the relying party. The interaction may be a transaction which requires the user to provide personal data to the relying party (e.g., a transaction to purchase restricted goods and/or resources from the relying party). In some embodiments, the user may begin the interaction online, by clicking a button such as "PURCHASE" or "BUY". The user may then use the digital identity application on the user device 600 to provide a user identifier (e.g., a username such as example@email.com), which indicates that the user has an account registered at the digital identity computer 604. In other embodiments, the user may begin the interaction in-person, by presenting the user device 600 to the relying party computer 710, or to an access device (e.g., payment terminal) associated with the relying party computer 710. The user device 600 may display or transmit the user identifier from the digital identity application to the relying party computer 710 (or to the access device which thereafter transmit it to the relying party computer 710).

In step S802, after receiving a user identifier, the relying party computer 710 may transmit a request for personal data of the user to the digital identity computer 604. The request may comprise an indication of the type of personal data required, such as the name of the user, date of birth of the user, etc. The request may further comprise a policy token, which the digital identity computer 604 generates (e.g., in a previous request) and certifies, that includes the type of personal data and the level of detail of the personal data that the relying party computer 710 as predicates. For example, the relying party computer 710 may only wish to know if the user is above 21 years of age, and not the user's actual birthdate. The policy token may allow the relying party computer 710 to do so, by allowing a request of the attestation of the personal data, instead of the personal data itself.

In an optional step S804, if the identity provider computer 606 is "online" and is able to provide live access to the personal data of the user (e.g., the identity provider computer 606 provided an authentication token in FIG. 6), and after receiving a request for personal data of the user, the digital identity computer 604 may request access to the personal data of the user from an identity provider computer 606 by providing the authentication token of step S610 in FIG. 6. If the digital identity computer 604 had previously stored the encrypted personal data of the user, encrypted with the user public key, then steps S804 and S806 are not performed, and the digital identity computer may continue with step S808.

In an optional step S806, after receiving the authentication token, the identity provider computer 606 may transmit the encrypted personal data of the user encrypted with the user public key to the digital identity computer 604.

In step S808, after retrieving the encrypted personal data of the user, the digital identity computer 604 may retrieve the relying party public key and encrypt the encrypted personal data to form subsequently encrypted personal data (e.g., doubly encrypted data). The subsequently encrypted personal data may then be transmitted to the digital identity application on the user device 600, via the digital identity application server 606. The digital identity computer 604 may additionally transmit a consent request that the user consents to sharing the personal data (or attestations of) with the relying party computer 710.

In step S810, after receiving the subsequently encrypted personal data and the consent request from the digital identity computer 604, the digital identity application server 602 may allow the digital identity application on the user device 600 to display the consent request.

In step S812, the user may respond to the consent request by accepting, denying, or modifying some or all of the consent request in the digital identity application. For example, the user may modify the consent request so that the time that the relying party computer 710 can access the personal data is shorter. The digital identity application may then use the user secret key to remove the user layer of encrypted on the subsequently encrypted personal data to form modified subsequently encrypted personal data (e.g., encrypted personal data, encrypted only with the relying party public key).

In step S814, after the user responds to the consent request on the digital identity application, the digital identity application server 602 may transmit the consent response and the modified subsequently encrypted personal data to the digital identity computer 604.

In step S816, after receiving the consent response and the modified subsequently encrypted personal data, the digital identity computer 604 may generate an access token. The access token may comprise the consent response (e.g., the level of consent given by the user and the time that the relying party can access the personal data). The digital identity computer 604 may transmit the access token and the modified subsequently encrypted personal data to the relying party computer 710.

After receiving the access token and the modified subsequently encrypted personal data, the relying party computer 710 may use the relying party secret key to obtain the personal data associated with the user. The relying party computer 710 may access the personal data according to the details in the access token. The relying party may then complete the interaction with the user by using the personal data (e.g., the relying party may check if the user is above 21 years of age).

In some embodiments, after obtaining the access token and verifying the personal data, the relying party computer 710 can generate an authorization request message comprising the access token and a transaction amount, and can transmit it to a processing network computer via an acquirer computer. The processing network computer can exchange the access token for a real credential such as a PAN or primary account number, and can modify the authorization request message to include the PAN. The authorization request message may then be transmitted to an issuer computer for authorization. The issuer computer can then reply with an authorization response message approving or declining the transaction. After the transaction, and clearing and settlement process can take place where the transfer of funds occurs.

Figure 9:
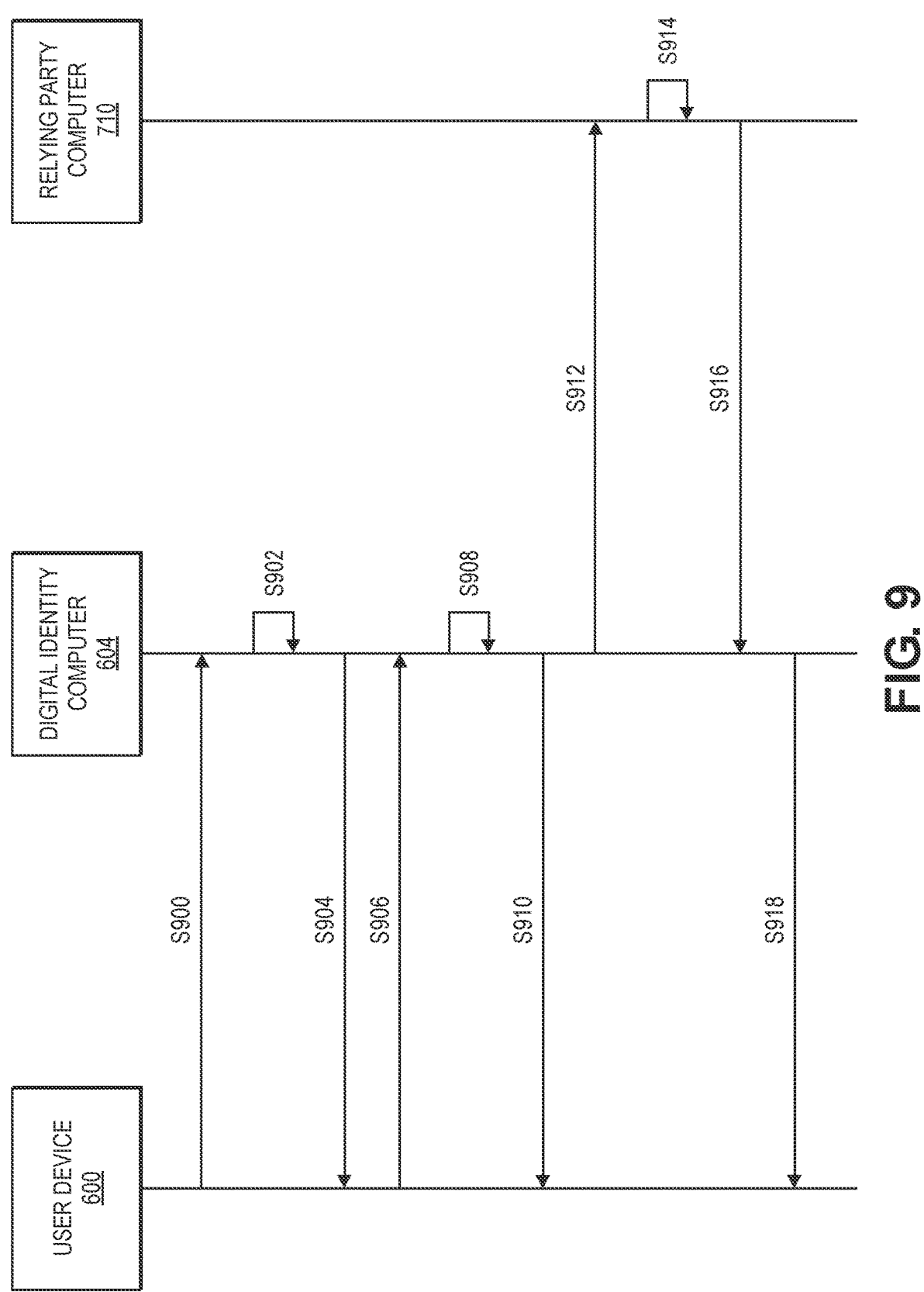
FIG. 9 shows a flow diagram of a user revoking a relying party computer's access to personal data associated with the user.

FIG. 9 shows a flow diagram of a user revoking a relying party computer's access to personal data associated with the user. The user may wish to revoke consent to sharing personal data with a relying party.

In step S900, the user may use the user device 600 to request to retract consent. The user device 600 may transmit a revoke request to the digital identity computer 604. The revoke request may comprise a relying party identifier, which identifies what consent the user wishes to revoke or modify.

In step S902, after receiving the revoke request from the user device 600, the digital identity computer 604 may user the relying party identifier to check the consent status. The digital identity computer 604 may check what personal data and for how long the personal data was consented to.

In step S904, the digital identity computer 604 may transmit the consent status to the user device 600.

In step S906, after receiving the consent status, the user may generate an updated consent status by selecting on the user device 600 one or more fields in the consent status that they wish to revoke or modify access to. For example, the user may indicate that they wish to completely revoke access to all personal data that was provided to the relying party. The user device 600 may then transmit the updated consent status to the digital identity computer 604.

In step S908, after receiving the updated consent status, the digital identity computer 604 may delete any stored data related to the consent. For example, the digital identity computer 604 may delete the encrypted personal data stored.

In step S910, after deleting data related to the consent status, the digital identity computer 604 may notify the user device 600 that the digital identity computer 604 has deleted all data relating to the consent status.

In step S912, after receiving the updated consent status, the digital identity computer 604 may notify the relying party computer 710 to delete all data relating to the consent status.

In step S914, after receiving the notification to delete all data from the digital identity computer 604, the relying party computer 710 may delete all data relating to the consent status. For example, the relying party computer 710 may delete the personal data associated with the user and the access token.

In step S916, after deleting all data relating to the consent status, the relying party computer 710 may notify the digital identity computer 604 that all data was deleted.

In step S918, after receiving notification that the digital identity computer 604 has deleted relevant data, the digital identity computer 604 may notify the user device 600 that all data relating to the consent status has been deleted.

Figure 10:
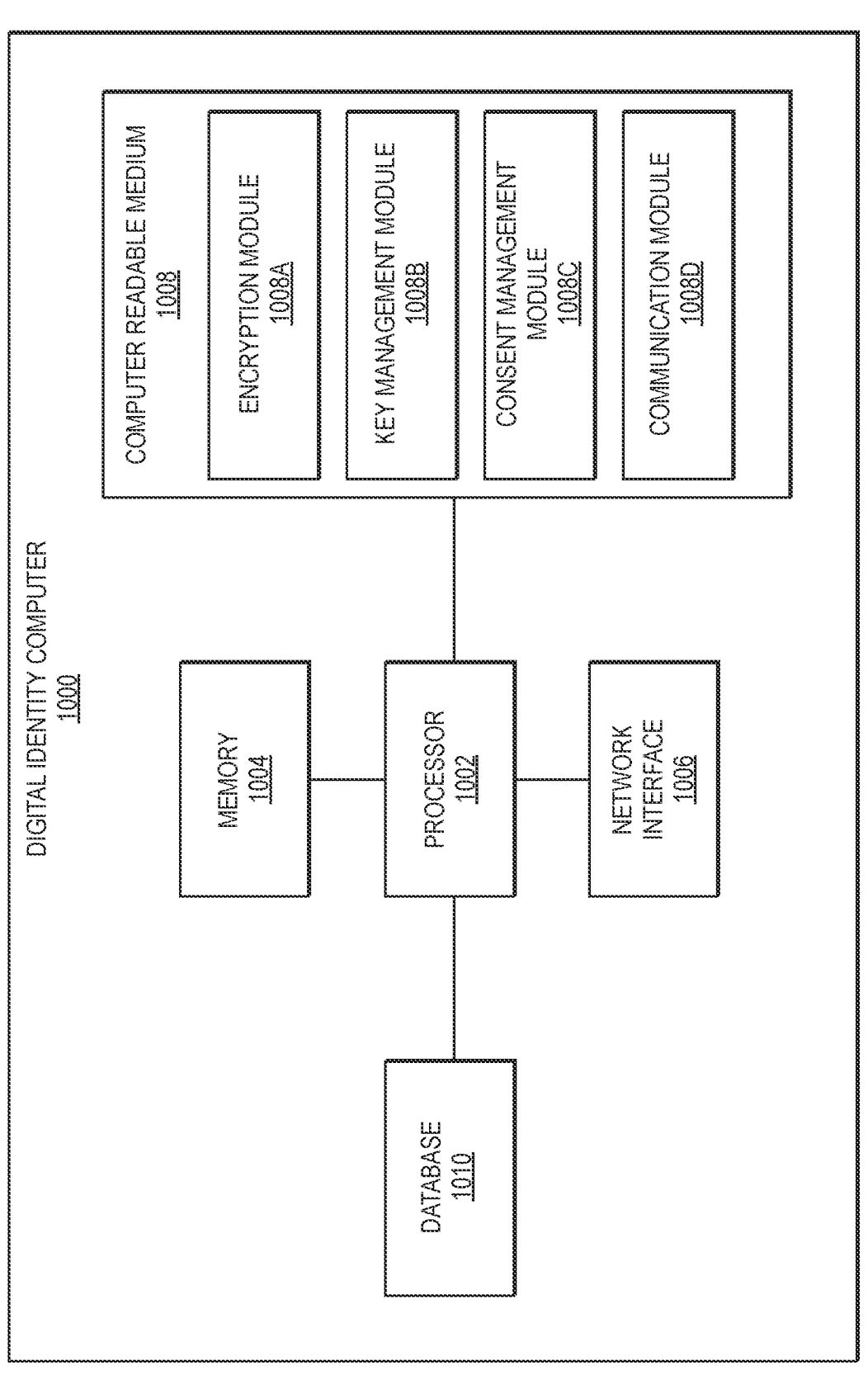
FIG. 10 shows a block diagram of a digital identity computer according to embodiments.

FIG. 10 shows a block diagram of a digital identity computer 1000 according to embodiments. The digital identity computer 1000 may be operated by a processing network. The digital identity computer 1000 may comprise a processor 1002. The processor 1002 may be coupled to a memory 1004, a network interface 1006, a computer readable medium 1008, and a database 1010. The computer readable medium 1008 may comprise any suitable number and types of software modules.

The memory 1004 may be used to store data and code. The memory 1004 may be coupled to the processor 1002 internally or externally (e.g., via cloud based data storage), and may comprise any combination of volatile and/or non-volatile memory such as RAM, DRAM, ROM, flash, or any other suitable memory device. The database 1010 may be similar to the memory 1004, and may store ciphertexts such as encrypted personal data associated with a user.

The network interface 1006 may include an interface that can allow the digital identity computer 1000 to communicate with external computers. The network interface 1006 may enable the digital identity computer 1000 to communicate data to and from another device such as a user device, relying party computer, identity provider computer, acquirer computer, key management computer, etc. Some examples of the network interface 1006 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 1006 may include Wi-Fi™. Data transferred via the network interface 1006 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 1006 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The computer readable medium 1008 may comprise code, executable by the processor 1002, for a method comprising: receiving, by a digital identity computer, a request for personal data associated with a user comprising a first public key associated with a relying party or derivative thereof; retrieving, by a digital identity computer, encrypted personal data associated with the user, wherein the personal data is encrypted with a second public key associated with the user; encrypting, by the digital identity computer, the encrypted personal data with the first public key associated with a relying party or derivative thereof to form subsequently encrypted personal data; and transmitting, by the digital identity computer, the subsequently encrypted personal data or derivative thereof to a (i) relying party computer, or (ii) a user device associated with the user and wherein the user device, which thereafter transmits the subsequently encrypted personal data or derivative thereof to the relying party computer, wherein in after either (i) or (ii), the relying party computer obtains the personal data from the subsequently encrypted personal data or derivative thereof.

The computer readable medium 1008 may comprise a number of software modules including, but not limited to, an encryption module 1008A, a key management module 1008B, a consent management module 1008C, and a communication module 1008D.

The encryption module 1008A may comprise code that causes the processor 1002 to perform encryptions and decryptions of data. The encryption module 1008A may generate encryption key, and use the encryption keys to encrypt and decrypt data. For example, the encryption module 1008A may generate a long-term public key that is used to encrypt personal data of users in storage (e.g., in the memory 1004 or the database 1010). The encryption module 1008A may additionally receive user public keys and relying party public keys and encrypt personal data, or perform re-encryptions using re-encryption keys.

The key management module 1008B may comprise code that causes the processor 1002 to manage encryption keys. For example, the key management module 1008B may allow the digital identity computer 1000 to communicate with a key management computer to store encryption keys. The key management module 1008B may store and retrieve encryption keys associated with users and relying parties from key databases managed by key management computers.

The consent management module 1008C may comprise code that causes the processor 1002 to generate, modify, and delete consents for users. For example, the consent management module 1008C may generate a consent request for a user to respond to. The consent management module 1008C may then generate access tokens that indicate the level of consent, and length of time that the user consents to. The consent management module 1008C may also receive revoke requests from user devices, and modify consents according to the revoke request.

The communication module 1008D may comprise code that causes the processor 1002 to generate messages, forward messages, receive message, reformat messages, and/or otherwise communicate with other entities. In some embodiments, the communication module 1008D may facilitate messages being transmitted to and from a user device, a relying party computer, an identity provider computer, etc.

Figure 11:
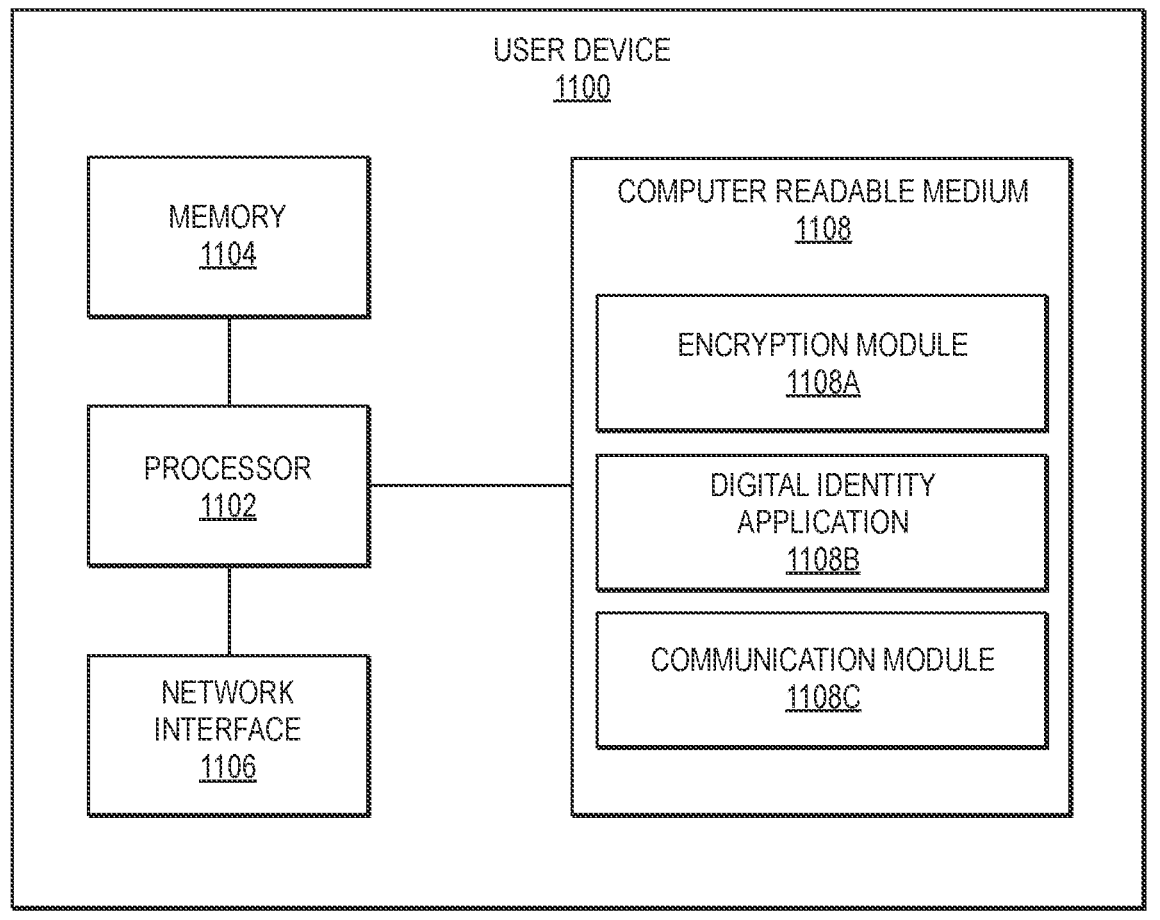
FIG. 11 shows a block diagram of a user device according to embodiments.

FIG. 11 shows a block diagram of a user device 1100 according to embodiments. The user device 1100 may be operated by a user. The user device 1100 may comprise a processor 1102. The processor 1102 may be coupled to a memory 1104, a network interface 1106, and a computer readable medium 1108. The computer readable medium 1108 may comprise any suitable number and types of software modules.

The memory 1104 and network interface 1106 may have the same or different features to the previously described memory 1004 and network interface 1006.

The computer readable medium 1108 may comprise code, executable by the processor 1102, for a method comprising: initiating, by a user device, a request for personal data associated with the user operating the user device, wherein a relying party computer communicating with the user device transmits the request for personal data to a digital identity computer, the request comprising a first public key associated with the relying party operating the relying party computer; and transmitting, by the user device to the digital identity computer, consent for the personal data to be shared with the relying party, wherein thereafter the digital identity computer completes the request for personal data associated with the user by: encrypting, by the digital identity computer, the encrypted personal data with the first public key associated with a relying party or derivative thereof to form subsequently encrypted personal data; and transmitting, by the digital identity computer, the subsequently encrypted personal data or derivative thereof to a (i) relying party computer, or (ii) a user device associated with the user and wherein the user device, which thereafter transmits the subsequently encrypted personal data or derivative thereof to the relying party computer, wherein in after either (i) or (ii), the relying party computer obtains the personal data from the subsequently encrypted personal data or derivative thereof.

The computer readable medium 1108 may comprise a number of software modules including, but not limited to, an encryption module 1108A, a digital identity application 1108B, and a communication module 1008D.

The encryption module 1108A may comprise code that causes the processor 1102 to perform encryptions and decryptions of data. The encryption module 1108A may generate encryption key pairs using an asymmetric commutative encryption scheme. For example, the encryption module 1108A may generate a user public key and user secret key. The encryption module 1108A may use the user public key to encrypt personal data. Additionally, the encryption module 1108A may generate re-encryption keys using the user secret key and a relying party public key. The encryption module 1108A may apply the re-encryption key to modify the encryption on encrypted data.

The digital identity application 1108B may comprise code that causes the processor 1102 to maintain a digital identity account. The digital identity application 11086 may store personal data associated with the user operating the user device 1100. The digital identity application 11086 may allow the user device 1100 to communicate with a digital identity application server, which maintains the digital identity account. The digital identity application 11086 may additionally allow the user to manage consents related to the digital identity account. For example, if the user device 1100 transmitted personal data stored by the digital identity application 11086 and provided consent to a relying party to access the personal data, the digital identity application 11086 may be used to modify the consent.

The communication module 1100C may have the same or different features to the previously described network interface 1008D.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:

receiving, by a digital identity computer, a request for personal data associated with a user comprising a first public key associated with a relying party;

retrieving, by the digital identity computer, encrypted personal data associated with the user, wherein the personal data is encrypted with a second public key associated with the user;

encrypting, by the digital identity computer, the encrypted personal data with the first public key associated with the relying party to form subsequently encrypted personal data; and transmitting, by the digital identity computer, the subsequently encrypted personal data and a consent request that the user consents to sharing the personal data with the relying party to a user device operated by the user and wherein the user device is programmed to display the consent request to the user, receive the user's consent from the user in response to the consent request, use a second secret key associated with the second public key to remove a layer of encryption from the subsequently encrypted personal data to form a derivative of the subsequently encrypted personal data and then transmit the derivative of the subsequently encrypted personal data and a consent response to the digital identity computer;

receiving, by the digital identity computer, the derivative of the subsequently encrypted personal data and the consent response;

generating, by the digital identity computer, an access token based on the consent response; and transmitting, the derivative of the subsequently encrypted personal data and the access token to a relying party computer, which is programmed to obtain the personal data from the derivative of the subsequently encrypted personal data in accordance with the access token using a first private key associated with the first public key, and perform an interaction with the user based on the personal data.

2. The method of claim 1, wherein the request for the personal data associated with the user is received from the relying party computer, and wherein the digital identity computer accesses a database to retrieve the encrypted personal data.

3. The method of claim 1, wherein the request for the personal data associated with the user is received from the user device, wherein the digital identity computer accesses a database to retrieve the encrypted personal data.

4. The method of claim 1, wherein the digital identity computer accesses a database to retrieve the personal data encrypted with the second public key associated with the user.

5. The method of claim 1, wherein retrieving the encrypted personal data associated with the user comprises:

transmitting, by the digital identity computer to an identity provider computer, a request for the personal data encrypted with the second public key associated with the user, receiving, by the digital identity computer from the identity provider computer, the encrypted personal data, wherein the personal data is encrypted with the second public key associated with the user.

6. The method of claim 1, wherein the user device is a mobile device.

7. The method of claim 1, wherein the encrypted personal data associated with the user comprises an assertion of the personal data requested.

8. The method of claim 1, wherein the consent response comprises a length of consent for the personal data to be shared for and a level of access of the personal data.

9. The method of claim 1, wherein the second public key associated with the user is a public key unique to and stored by a digital identity application on the user device.

10. The method of claim 1, wherein the first public key associated with the relying party and the second public key associated with the user are generated using a public-secret key commutative encryption scheme.

11. The method of claim 1, wherein the personal data associated with the user comprises identity data.

12. A digital identity computer comprising:

a processor; and a non-transitory computer readable medium comprising instructions executable by the processor to perform operations including:

receiving a request for personal data associated with a user comprising a first public key associated with a relying party;

retrieving encrypted personal data associated with the user, wherein the personal data is encrypted with a second public key associated with the user;

encrypting the encrypted personal data with the first public key associated with the relying party to form subsequently encrypted personal data;

transmitting the subsequently encrypted personal data and a consent request that the user consents to sharing the personal data with the relying party to a user device operated by the user and wherein the user device is programmed to display the consent request to the user, receive the user's consent from the user in response to the consent request, use a second secret key associated with the second public key to remove a layer of encryption from the subsequently encrypted personal data to form a derivative of the subsequently encrypted personal data and then transmit the derivative of the subsequently encrypted personal data and a consent response to the digital identity computer;

receiving, by the digital identity computer, the derivative of the subsequently encrypted personal data and the consent response;

generating, by the digital identity computer, an access token based on the consent response; and transmitting, the derivative of the subsequently encrypted personal data and the access token to a relying party computer, which is programmed to obtain the personal data from the derivative of the subsequently encrypted personal data in accordance with the access token using a first private key associated with the first public key, and perform an interaction with the user based on the personal data.

13. The digital identity computer of claim 12, further comprising a database comprising encrypted personal data for a plurality of users, wherein the personal data of one of the plurality of users is encrypted using a public key unique to the user.

14. A method comprising:

initiating, by a user device operated by a user, a request for personal data associated with the user operating the user device, wherein a relying party computer operated by a relying party communicating with the user device transmits the request for the personal data to a digital identity computer;

receiving, by the user device from the digital identity computer, subsequently encrypted personal data and a consent request;

displaying, by the user device, the consent request to the user;

using a second secret key associated with a second public key to remove a layer of encryption from the subsequently encrypted personal data to form a derivative of the subsequently encrypted personal data; and transmitting, by the user device to the digital identity computer, a consent response for the personal data to be shared with the relying party and the derivative of the subsequently encrypted personal data, wherein the digital identity computer is programmed to:

encrypt encrypted personal data with a first public key associated with the relying party to form the subsequently encrypted personal data, generate an access token based on the consent response, transmit the subsequently encrypted personal data to the user device, and transmit the derivative of the subsequently encrypted personal data and the access token to the relying party computer, wherein the relying party computer is programmed to obtain the personal data from the derivative of the subsequently encrypted personal data using a first private key associated with the first public key, access the personal data according to details in the access token, and perform an interaction with the user based on the accessed personal data.

15. The method of claim 14, wherein the user device is a mobile device.

16. The method of claim 14, wherein the consent response comprises a length of time in which the relying party computer can have access to the personal data, and a level of access, where the level of access determines if the personal data is sent or an assertion of the personal data is sent.

17. The method of claim 14, wherein the personal data comprises a date of birth of the user or contact information of the user.

18. The method of claim 14, wherein the user device comprises a digital identity application comprising the personal data and payment account data, the relying party computer also being programmed to use the payment account data to perform the interaction.

19. The method of claim 14, wherein the personal data comprises information about the user.

* * * * *